United States Patent Office 3,192,771
Patented July 6, 1965

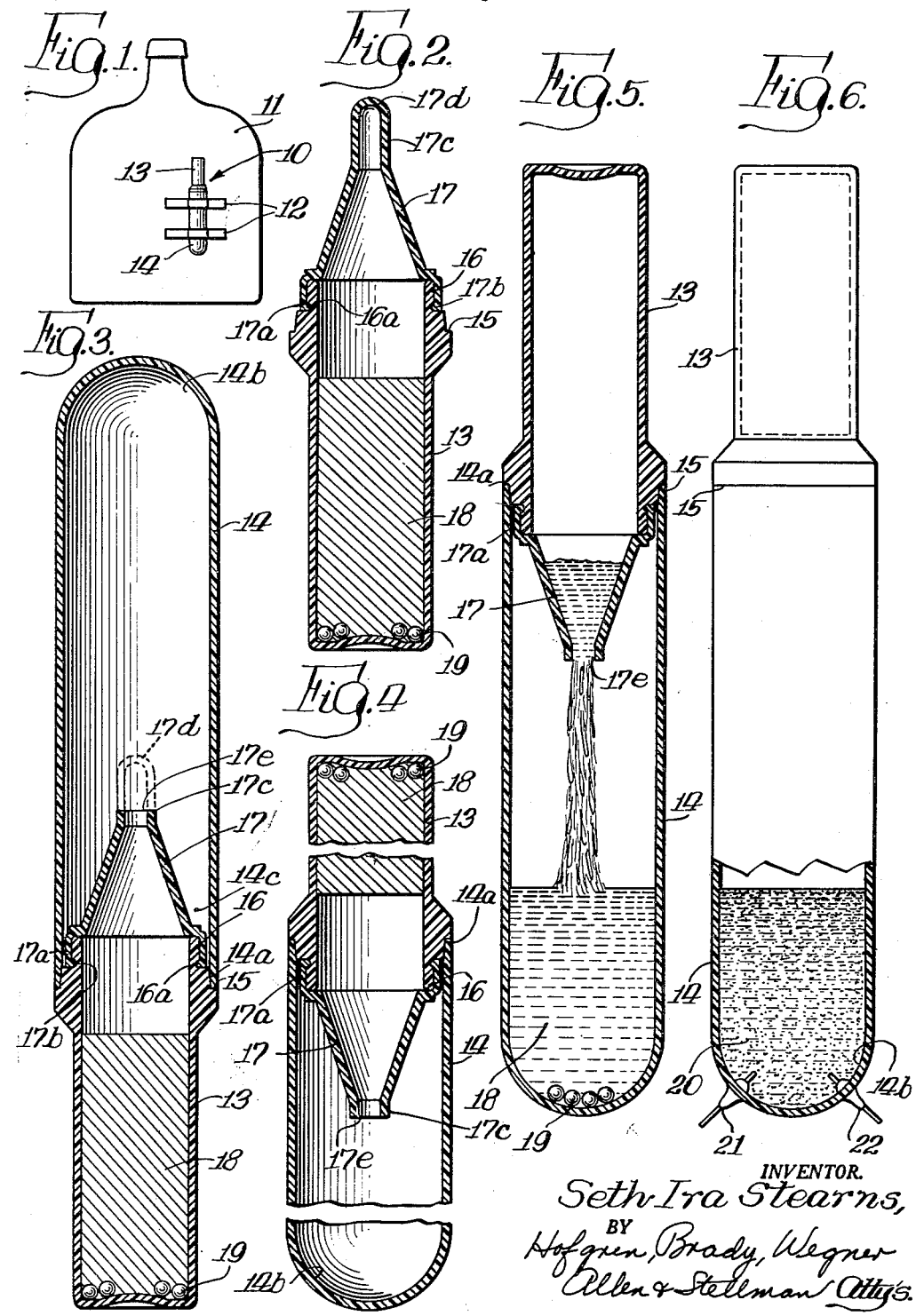

3,192,771
HEAT SENSITIVE UNIT
Seth Ira Stearns, Elgin, Ill.
(3505 44th St., Moline, Ill.)
Filed Sept. 2, 1960, Ser. No. 53,793
4 Claims. (Cl. 73—358)

This invention relates to a temperature sensitive device and more particularly to a device adapted to undergo a permanent structural change as the result of a temperature change to a predetermined point and to subsequently give warning of the temperature change.

There are a number of substances designed for human consumption which are irrevocably damaged by changes, normally increases, in temperature. Further, a great many of these items though irrevocably damaged by such a change do not by change in outward appearance indicate that they have been damaged. As a result of this, it often occurs that people consume such substances with deleterious effects. Prominent among these substances are a number of drugs, some foods and whole blood.

In overcoming this dangerous situation, it is desirable to provide a device which is capable of indicating the fact that at some previous time the temperature changed to a point which would damage one of the above substances so that human consumption can be avoided. It is also desirable to provide such a device which cannot be put back in its original condition to avoid announcing the fact that a temperature change has resulted. Particularly since with regard to the substances described, it is often desirable to attempt to make use of them even though a temperature change has occurred because of the possible economic loss to the owner.

It is therefore an object of this invention to provide a temperature sensitive device which has the advantages mentioned above and which is capable of overcoming the problems set forth.

It is another object of this invention to provide a temperature sensitive device which is adapted to undergo a permanent structural change as the result of a temperature change to a predetermined point to thereby subsequently give warning of said temperature change comprising an at least partially transparent first container having an opening therein, an amount of a solid substance in said first container capable of changing to a liquid at a predetermined temperature, an at least partially transparent second container connected to said first container and adapted to automatically receive said substance when it has changed to a liquid state and to retain said substance whether it is in a liquid or solid state.

It is another object of this invention to provide a transportable portion in said temperature sensitive device which is transportable regardless of temperature comprising a container having an extending neck portion, at least said neck portion being of an incisable material, and an amount of a substance in said container capable of changing from a solid to a liquid at a predetermined temperature, the neck portion being adapted to be cut to provide an opening therein and said container thereafter being adapted to be connected to a second container to provide the temperature sensitive device.

Other objects and advantages of the invention will become apparent from the following description taken together with the accompanying drawings.

Of the drawings:

FIGURE 1 is a front elevational view showing a container with the temperature sensitive device of this invention attached thereto;

FIGURE 2 is a vertical sectional view of a portion of the temperature sensitive device in shipping condition;

FIGURE 3 is a vertical sectional view of the temperature sensitive device in an inverted position showing a portion of the neck in dotted lines;

FIGURE 4 is a partial vertical sectional view showing the temperature sensitive device in an operative position;

FIGURE 5 is a vertical sectional view showing the temperature sensitive device undergoing a change due to change in temperature; and FIGURE 6 is a front elevational view partially broken away in vertical section of a second embodiment of the temperature sensitive device.

Referring now to the drawings, the temperature sensitive device 10 is shown in FIGURE 1 attached to a container 11 by means of a pair of strips 12 of conventional adhesive tape or the like. This would be one way for attaching the temperature sensitive device to determine a change in temperature. The container 11 may contain drugs, foodstuffs or whole blood which would require refrigeration and storage below a predetermined temperature.

The temperature sensitive device 10 includes a first container 13 and a second container 14. These containers are customarily constructed of a transparent plastic material. However, this is not absolutely necessary so long as the containers are constructed as to be at least partially transparent. The first container 13 is molded with a circumferential ridge 15 on which can be seated the second container 14. Thus, the lip 14a of the second container is seated on the ridge 15 and is cemented in that position to provide permanent connection.

A second ridge 16 is also circumferentially provided on the first container 13. This ridge is designed to seat a cap 17. Thus the mouth 17a of the cap 17 is designed to be seated on the ridge 16 and an enlarged portion 17b is designed to be received in the indented portion 16a on the container 13. The cap 17 is cemented in position for permanent connection.

The cap 17 includes a neck so that it is narrower near its terminus 17c than at its mouth 17a. The cap functions in a dual manner. Thus in FIGURE 2 it is shown in a shipping condition. Therein the cap has no opening but is closed by a contiguous piece of material 17d. In this condition the cap seals the container 13 so that it matters not the temperature nor the disposition of the container 13 during shipment. Prior to the use of the temperature sensing device, the end 17d (see FIGURE 3) of the cap 17 is removed with a scissors or knife since at least it is constructed of an incisable material to provide the opening 17e.

An amount of a temperature sensitive substance 18 is provided in the interior of the container 13. The substance is one that will be solid at some temperatures and liquid at others, and have a relatively sharp point of change or melting point therebetween. For example, numerous waxy materials, glycerine, numerous other oily materials, and even water may be used. The material and the choice thereof is entirely dependent upon the substance which is to be protected against temperature change and it is only necessary to choose a material which has a melting point corresponding with the danger temperature for the substance to be protected. One skilled in the art armed with any conventional chemical handbook would have no difficulty in making such a choice.

In order to insure notification of temperature change, a dyestuff or other colored material may be included in the substance 18. Further a plurality of objects or balls 19 may also be included for the same purpose.

In operation this embodiment of the invention is attached to a container such as 11, and the container with the temperature sensitive device 10 attached is placed in an atmosphere such as an icebox or cool room having a temperature satisfactory to protect the material in the container 11. For example, whole blood would be kept under refrigeration. In the event the temperature of the atmosphere were, through mechanical failure or the like, to rise above the temperature at which the substance may be safely maintained, the substance 18 which has been chosen because it melts at the same temperature will change from a solid to a liquid. Since the temperature sensing device is located on the container 11 with the container 13 at the top and the container 14 at the bottom, the substance 18 will run down (as shown in FIGURE 5) in a liquid state through the opening 17e into the container 14, carrying together with it any dyestuff mixed with it, and the balls 19, if present. This gives a positive indication that the temperature of the atmosphere has risen above the safety point since it will be apparent to anyone inspecting the temperature sensitive device that the substance 18 has melted and run into the lower container.

As an additional safety feature, the temperature sensing device of this invention is provided with the extending neck portion of the cap 17. Due to this construction it is almost impossible to get all of the substance 18 back into the container 13. Thus if the device is simply inverted to the position shown in FIGURE 3, at least some of the material will be trapped around the base of the cap 17 as at 14c. Thus, some of the material will always remain in the container 14. Further, it would be almost impossible to get the balls 19 to pass through the opening 17e, and thus, the presence of the balls in the bottom of the container 14 is positive evidence of a temperature change.

In the embodiment of FIGURE 6, a unit is shown which is of substantially the same construction as that already described with the exception that it is designed to operate an electrical circuit. Thus, the substance 20 shown in this view in the container 14 contains an amount of electrically conductive substance such as a metal powder, for example, silver powder and the like. A pair of electrodes 21 and 22 are located in the container 14. These electrodes may be connected to a bell circuit and the like. Thus, if the temperature in the area surrounding the device of FIGURE 6 rises above the melting point of the substane 20, it will rund down into the lower part 14b of the container 14 making a circuit between the electrodes 21 and 22, and thus energizing an electrical circuit.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:
1. In a temperature sensitive device adapted to undergo a structural change as a result of a temperature increase to a predetermined temperature to thereby give warning of said temperature increase, a portion transportable regardless of temperature, comprising: a container having an extending neck portion, at least said neck portion being of an incisible material adapted to be cut to form an opening therein; and an amount of a substance in said container which is solid at temperatures below a predetermined point and in a liquid state above said predetermined point, said substance being capable of changing from a solid to a liquid at temperatures in excess of said predetermined temperature, said substance containing a plurality of objects adapted to pass through said opening in said neck portion, said neck portion being insertable in a second container having an opening for receiving the same so that said substance can automatically enter said second container when in said liquid state, said neck portion being disposed in said second container opening a distance sufficient to prevent the return of at least part of said substance and said objects to said first container.

2. The device of claim 1 wherein said objects are colored balls.

3. A temperature sensitive device adapted to undergo a permanent structural change as a result of a temperature increase to a predetermined temperature and thereby subsequently give warning of said temperature increase, comprising: a first container having a funnel-like neck portion with an opening therein, said neck portion extending downwardly and inwardly to ecourage gravitational flow; a temperature responsive solid in said first container capable of changing to a liquid at a temperature in excess of said predetermined temperature; a plurality of objects in said substance adapted to pass through the opening in said neck portion; and at least partially transparent second container below said first container and enclosing at least a part of said neck portion and said opening, said second container in a position to automatically receive said substance and said objects when said substance has changed to a liquid state and has flowed through said neck into said second container so that the return of all of said substance and all of said objects from said first container to said second container is prevented by said neck portion when said device is inverted relative to its original position.

4. The device of claim 3 wherein said objects are colored balls.

References Cited by the Examiner
UNITED STATES PATENTS

| 2,691,892 | 10/54 | Broad | 73—371 |
| 2,740,866 | 4/56 | Wappner | 200—142 |
| 2,847,067 | 8/58 | Brewer | 73—358 |
| 2,887,240 | 5/59 | Deussen | 215—99 |
| 3,055,759 | 9/62 | Busby | 73—356 X |

ISAAC LISANN, *Primary Examiner.*
LEONARD FORMAN, *Examiner.*